Feb. 29, 1944. F. B. HALFORD 2,343,055
ENGINE CONNECTING ROD
Filed Oct. 30, 1941 2 Sheets-Sheet 1
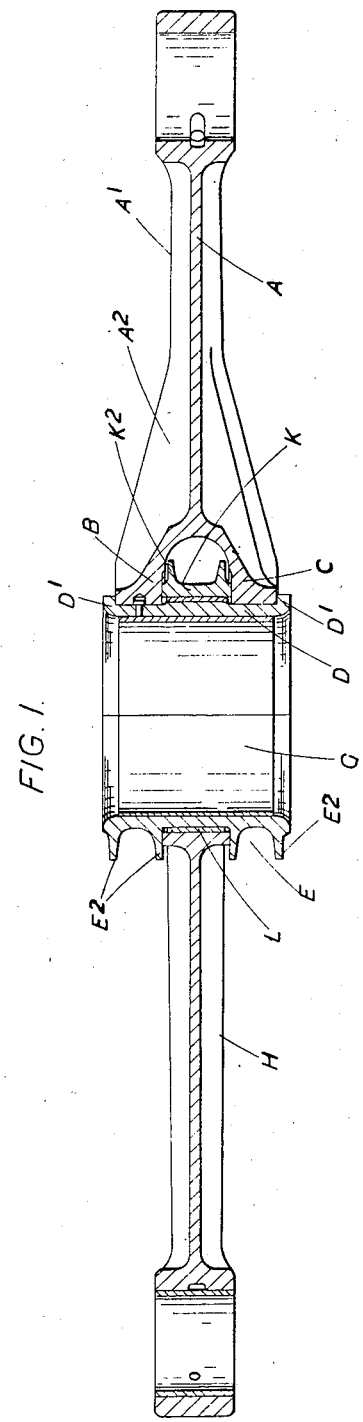
FIG. I.
INVENTOR
F. B. HALFORD
By Blair + Kilcoyne
ATTORNEYS Feb. 29, 1944.  F. B. HALFORD  2,343,055
ENGINE CONNECTING ROD
Filed Oct. 30, 1941  2 Sheets-Sheet 2
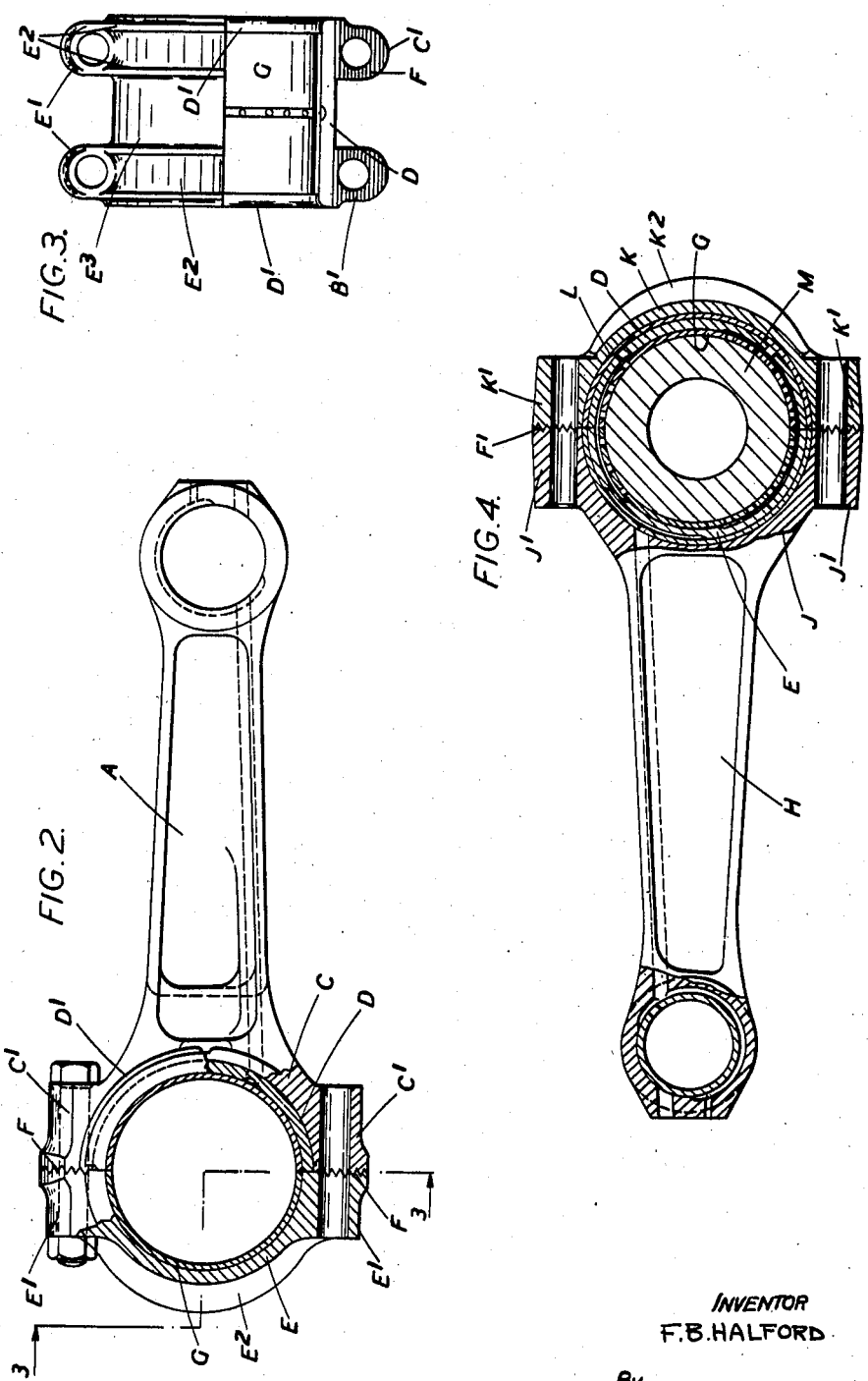
INVENTOR
F.B.HALFORD
By
ATTORNEYS Patented Feb. 29, 1944

2,343,055

UNITED STATES PATENT OFFICE 2,343,055

ENGINE CONNECTING ROD

Frank Bernard Halford, Edgware, England, assignor to D. Napier & Son Limited, London, England, a company of Great Britain Application October 30, 1941, Serial No. 417,198
In Great Britain November 8, 1940

8 Claims. (Cl. 74—580)

This invention relates to engine connecting rods more especially for internal combustion engines and has for its object to effect certain improvements in rods of that type which are used to connect to a single crank pin the pistons in two cylinders disposed for example in separate banks of cylinders situated on opposite sides of the crankshaft. The present improvements provide various advantages including increased strength in the big-ends of such connecting rods.

According to this invention there is combined with a big-end which is forked in the direction of the axis of the crank pin, a shell which extends between and is carried by the two arms of the fork, a cap which extends as one piece between both arms of the fork and being attached to both these arm forms a connection between them, and a bearing for the big-end of a second connecting rod on the shell and the cap and between the fork arms of the big-end of the first connecting rod. The cap is preferably formed externally with at least two ribs or flanges which extend in the radial direction and run circumferentially, these ribs lying on opposite sides of the bearing for the second connecting rod. The lateral portions of the cap are provided with lugs or enlargements through which pass the bolts by which the cap is attached to the fork arms of the big-end. These enlargements engage directly and are bolted up to the corresponding end parts of those fork arms which also are enlarged or formed with lugs for the passage of the bolts. These lateral portions of the cap butt up against the corresponding parts of the shell which is carried in the fork arms and thus hold this shell in place. Conveniently the ends of this shell, considered in the direction of the crank pin axis, are provided externally with flanges which run circumferentially and serve to prevent the shell from being displaced in the axial direction. The bearing metal which lines the shell and cap is preferably in strip form.

The construction of the second connecting rod big-end is on somewhat the same lines except that it is not forked, but it is formed so as to lie between the fork arms of the big-end of the first rod. The lateral portions of the big-end are provided with lugs or enlargements as also are the corresponding parts of the cap these enlargements on the big-end and cap butting up against each other and being bolted up together by bolts which pass through them. A two-part shell with a lining of bearing metal, preferably in strip form, lies within the cap and the end of the connecting rod. The cap may have formed on its exterior one or more ribs or flanges projecting radially and running circumferentially.

The accompanying drawings illustrate by way of example a construction which may be adopted in carrying the invention into practice. In these drawings, Figure 1 is a section through the two connecting rods when in line the section being in a plane containing the axis of the crank pin and running through the centres of the two connecting rods.

Figure 2 is a side elevation of the first or forked connecting rod a part of the one fork of this big-end being shown in section as in a plane normal to the crank pin axis and the plane lying about the centre of the width of one of the big-end fork arms.

Figure 3 is an end view of the big-end of the forked connecting rod seen in Figure 2 the lower part of Figure 3 being a section on the broken line 3—3 in Figure 2.

Figure 4 is a sectional side elevation of the second connecting rod the section being in a plane lying about the centre of the width of the big-end of this connecting rod as it is seen in Figure 1 and normal to the crank pin axis.

The big-end of the first connecting rod A is forked transversely that is in the direction of the crank pin axis. The two fork arms B and C carry between them a shell D which extends in one piece between these arms the ends of the shell being formed with circumferential flanges $D^1$ which prevent displacement of the shell in the axial direction. A cap E extends in one piece between the fork arms B and C to both of which the cap is connected by bolts which pass through lugs $E^1$ with which the cap is provided and lugs $B^1$ and $C^1$ formed on the fork arms B and C. This cap E thus acts as a rigid connection between the fork arms of the connecting rod A. The cap E is formed externally with ribs $E^2$, in this case four in number, which run circumferentially and are spaced apart in the transverse direction. The lugs or enlargements $E^1$ of the cap butt up against the corresponding parts of the shell D, as can be seen in Figure 2, when the cap is bolted up in place. The abutting faces of the lugs of the cap and the lugs or enlargements $B^1$ and $C^1$ are conveniently serrated as shown at F in Figure 2, to interengage in a known manner. Bearing metal G, preferably in strip form, serves as a lining for the shell D and cap E.

The second connecting rod H has its big-end J provided with enlargements or lugs $J^1$ and has a cap K with lugs $K^1$ for bolts which are passed also through the lugs $J^1$. The cap is conveniently formed with external flanges or ribs K² which run circumferentially. There is a lining of bearing metal L preferably in strip form within the big-end J and cap K. This big-end lies on the part E³, seen in Figure 3, of the cap E and between the fork arms B and C of the connecting rod A being located laterally between two of the flanges E² on the cap E.

As in the case of the big-end of the first connecting rod A so the abutting parts of the cap K and big-end J of the second connecting rod may be serrated as shown at F¹. These serrations interengage and give rigidity and strength to the big-end constructions.

The construction of the main part of the connecting rod A may vary, but it is designed to give the necessary strength to the forked big-end. Thus the main part of this rod may be of I-section as shown with the flanges A¹ widened out at the end of the web as at A² in Figure 1 so as to extend across the back of the fork arms B and C.

A connecting rod of the conventional type is apt to be subject to what is commonly known as "fretting" due to flexing of the forked big-end. In the present improved construction, however, the integral formation of the cap E adds greatly to the strength of the forked rod, particularly when the abutting faces of the lugs which are bolted up together are formed to interengage as by providing serrations in these parts as above mentioned. Yet further, in the ordinary rod construction it is not easy to produce satisfactory bearings which are metalled both inside for the crank pin M and on the outside for the second connecting rod. On the other hand with the present invention it is easy to employ strip bearings in a form now well-known.

What I claim as my invention and desire to secure by Letters Patent is:

1. In an engine connecting rod structure the combination of a connecting rod having a big end which is forked in the direction of the axis of the crank pin with the fork arms integral with the connecting rod and both extending half around, a shell which extends between and is carried by the two arms of the fork, a cap which extends in one piece between both arms of the fork, the shell and cap cooperating to receive the crank pin bearing, means by which this cap is directly attached to both arms of the fork so that the cap forms a connection between these arms, a second connecting rod, and a bearing for the big end of this connecting rod on the said shell and cap of the big end of the first connecting rod and between the fork arms of that big end.

2. In an engine connecting rod structure the combination of a connecting rod having a big end which is forked in the direction of the axis of the crank pin with the fork arms integral with the connecting rod and both extending half around, a shell which extends between and is carried by the two arms of the fork, a cap which extends in one piece between both arms of the fork the shell and cap cooperating to receive the crank pin bearing, at least two ribs which project radially from and run circumferentially on the exterior of the cap, means by which this cap is directly attached to both arms of the fork so that the cap forms a connection between these arms, a second connecting rod, and a bearing for the big end of this connecting rod on the said shell and cap of the big end of the first connecting rod, this bearing lying between the fork arms of that big end and between two of the said ribs on the exterior of the cap.

3. In an engine connecting rod structure the combination of a connecting rod having a big end which is forked in the direction of the axis of the crank pin with the fork arms integral with the connecting rod and both extending half around, a shell which extends between and is carried by the two arms of the fork, a cap which extends in one piece between both arms of the fork, the shell and cap cooperating to receive the crank pin bearing, enlargements on each end part of each fork arm, corresponding enlargements on each end part of the cap and holes through all these enlargements for bolts by which the cap is directly attached to both fork arms thus forming a connection between these arms, a second connecting rod, and a bearing for the big end of this connecting rod on the said shell and cap of the big end of the first connecting rod and between the fork arms of that big end.

4. In an engine connecting rod structure the combination of a connecting rod having a big end which is forked in the direction of the axis of the crank pin with the fork arms integral with the connecting rod and both extending half around, a shell which extends between and is carried by the two arms of the fork, a cap which extends in one piece between both arms of the fork, the shell and cap cooperating to receive the crank pin bearing, and when in position has its lateral portions butting up against the corresponding parts of the said shell which is thereby held in place, the shell and cap cooperating to receive the crank pin bearing, means by which this cap is directly attached to both arms of the fork so that the cap forms a connection between these arms, a second connecting rod, and a bearing for the big end of this connecting rod on the said shell and cap of the big end of the first connecting rod and between the fork arms of that big end.

5. In an engine connecting rod structure the combination of a connecting rod having a big end which is forked in the direction of the axis of the crank pin with the fork arms integral with the connecting rod and both extending half around, a shell which extends between and is carried by the two arms of the fork, a cap which extends in one piece between both arms of the fork, means by which this cap is directly attached to both arms of the fork so that the cap forms a connection between these arms, the shell and cap cooperating to receive the crank pin bearing, a second connecting rod having a big end and a cap which is attached to this big end, and a bearing for this big end and cap on the said shell and cap of the big end of the first connecting rod the cap of the second connecting rod lying on this bearing between the fork arms of the big end of the first connecting rod.

6. In an engine connecting rod structure the combination of a connecting rod having a big end which is forked in the direction of the axis of the crank pin with the fork arms integral with the connecting rod and both extending half around, a shell which extends between and is carried by the two arms of the fork, a circumferential flange at each end of the shell serving to locate it in the fork arms and prevent endwise movement, a cap which extends in one piece between both arms of the fork, the shell and cap cooperating to receive the crank pin bearing, means by which this cap is directly attached to both arms of the fork so that the cap forms a connection between these arms, a second connecting rod, and a bearing for the big end of this connecting rod on the said shell and cap of the big end of the first connecting rod and between the fork arms of that big end.

7. In an engine connecting rod structure the combination of a connecting rod having a big end which is forked in the direction of the axis of the crank pin with the fork arms integral with the connecting rod and both extending half around, a shell which extends between and is carried by the two arms of the fork, a cap which extends in one piece between both arms of the fork, at least two ribs which project radially from and run circumferentially on the exterior of the cap, means by which this cap is directly attached to both arms of the fork so that the cap forms a connection between these arms, a second connecting rod having a big end and a cap which is attached to this big end, and a bearing for this big end and cap on the said shell and cap of the big end of the first connecting rod, the cap of the second connecting rod lying on this bearing between the fork arms of the big end of the first connecting rod and the part of this bearing which is on the cap lying between two of the said ribs on the exterior of that cap.

8. In an engine connecting rod structure the combination of a connecting rod having a big end which is forked in the direction of the axis of the crank pin with the fork arms integral with the connecting rod and both extending half around, the main part of this connecting rod being of I-section with the flanges widened out in the direction of the crank pin axis behind the fork arms, a shell which extends between and is carried by the two arms of the fork, a cap which extends in one piece between both arms of the fork, the shell and cap cooperating to receive the crank pin bearing, means by which this cap is directly attached to both arms of the fork so that the cap forms a connection between these arms, a second connecting rod, and a bearing for the big end of this connecting rod on the said shell and cap of the big end of the first connecting rod and between the fork arms of that big end.

FRANK BERNARD HALFORD.